No. 780,210. PATENTED JAN. 17, 1905.
R. MARX.
DEVICE FOR EXHIBITING PARTS OF BEDSTEADS OR THE LIKE.
APPLICATION FILED JUNE 6, 1903.

Witnesses
Anna R. McCole

Inventor
Rudolph Marx
By his attorney,
Edward P. Thompson.

No. 780,210. Patented January 17, 1905.

UNITED STATES PATENT OFFICE.

RUDOLPH MARX, OF OFFENBACH-ON-THE-MAIN, GERMANY.

DEVICE FOR EXHIBITING PARTS OF BEDSTEADS OR THE LIKE.

SPECIFICATION forming part of Letters Patent No. 780,210, dated January 17, 1905.

Application filed June 6, 1903. Serial No. 160,343.

*To all whom it may concern:*

Be it known that I, RUDOLPH MARX, merchant, a subject of the Emperor of Germany, residing at Offenbach-on-the-Main, in the Empire of Germany, (whose full postal address is 1 Geleitstrasse, Offenbach-on-the-Main aforesaid,) have invented certain new and useful Improvements in Devices for Exhibiting Parts of Bedsteads or the Like, of which the following is a specification.

Now this invention has for its object a device with which it is possible to connect the parts of a bedstead with one another without loss of space and so that they can conveniently be inspected by the public and stand quite firmly and not be damaged by rubbing against or otherwise encountering one another.

The improved holder is shown in the accompanying drawings in one form of construction.

Figure 1:
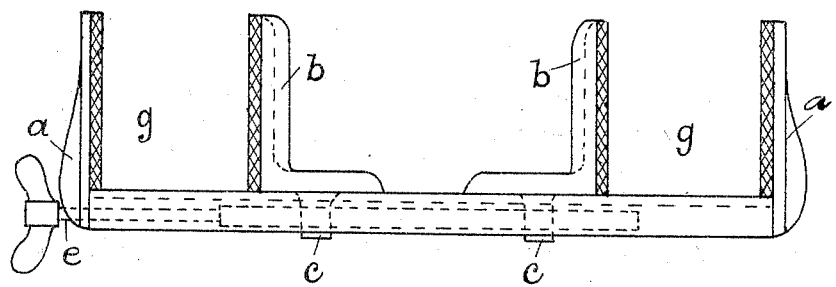
Figure 2:
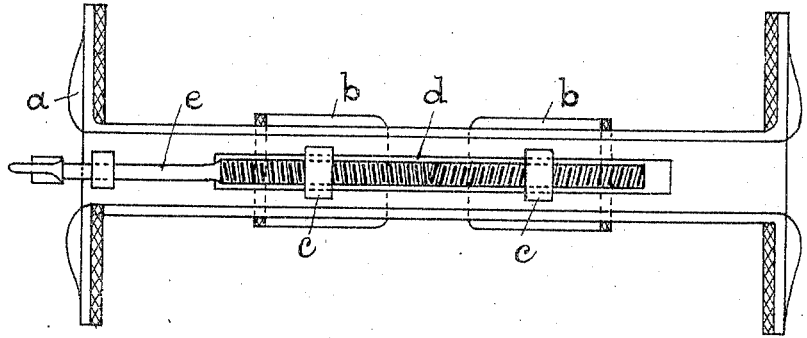

Figure 1 is an elevation, and Fig. 2 an inverted plan view.

As may be seen in the drawings, it consists of a double-elbow piece or frame $a$, on the center part of which two clamp-jaws $b$ are mounted, guided by means of projections $c$ in a long slot $d$ and connected with one another by means of a screwed spindle $e$ in such a way that when the screw is turned to the right or left they are moved apart or caused to approach, respectively. The outer elbows of the part $a$ and also the jaws $b$ are preferably coated with a soft material, such as felt or the like. Two of the holders are always employed, the posts of the bedsteads being made to stand between the jaws $a$ and $b$ in the part $g$. By unscrewing the screw-spindle $e$ the jaws $b$ are moved far enough apart to firmly press against the parts of the bedstead. The latter are thus rigidly connected at a short distance from one another and may be conveniently erected anywhere.

The screw $e$ may be provided, as shown in the drawings, with a right-hand and left-hand thread.

For clearness $a\ b$ on the right may be considered as one set of jaws, and $a\ b$ on the left may be considered as the other set of jaws. The movable jaws $b$ are respectively movable to and from the stationary jaws $a$.

I declare that what I claim is—

1. A device for exhibiting parts of bedsteads comprising a frame, two sets of jaws on said frame, means for simultaneously and relatively moving apart and approaching the members of each set of jaws, substantially as and for the purpose set forth.

2. A device for exhibiting parts of bedsteads comprising a frame, vertical projections on the ends of said frame, a slot in said frame, movable jaws guided in said slot, means for moving apart and approaching said jaws, substantially as and for the purpose set forth.

3. A device for exhibiting parts of bedsteads comprising a frame, vertical projections on the ends of said frame, a slot in said frame, movable jaws guided in said slot, means for moving apart and approaching said jaws, a covering of soft material on said projections and said jaws, substantially as and for the purpose set forth.

4. A device for exhibiting parts of bedsteads comprising a frame, vertical projections on the ends of said frame, a slot in said frame, movable jaws guided in said slot, right and left handed screws adapted to be turned and move apart and approach said jaws, substantially as and for the purpose set forth.

5. A device for exhibiting parts of bedsteads comprising a frame, two jaws fixed thereto, and two jaws located between and respectively movable to and from said fixed jaws.

In witness whereof I have hereunto signed my name, this 19th day of May, 1903, in the presence of two subscribing witnesses.

RUDOLPH MARX.

Witnesses:
JEAN GRUND,
CARL GRUND.